(12) United States Patent
Mederer

(10) Patent No.: US 12,103,538 B2
(45) Date of Patent: Oct. 1, 2024

(54) FORCE TRANSMISSION BETWEEN WHEEL AND ROAD

(71) Applicant: KNORR-BREMSE Systeme fuer Nutzfahrzeuge GmbH, Munich (DE)

(72) Inventor: Martin Mederer, Neumarkt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 277 days.

(21) Appl. No.: 17/689,319

(22) Filed: Mar. 8, 2022

(65) Prior Publication Data

US 2022/0281458 A1  Sep. 8, 2022

(30) Foreign Application Priority Data

Mar. 8, 2021 (DE) ...................... 10 2021 202 223.5

(51) Int. Cl.
| | |
|---|---|
| *B60W 10/08* | (2006.01) |
| *B60K 28/16* | (2006.01) |
| *B60W 10/18* | (2012.01) |
| *B60W 30/18* | (2012.01) |

(52) U.S. Cl.
CPC ...... *B60W 30/18172* (2013.01); *B60W 10/08* (2013.01); *B60W 10/18* (2013.01); *B60W 2520/26* (2013.01); *B60W 2520/28* (2013.01)

(58) Field of Classification Search
CPC ....... B60W 30/18172; B60W 2520/26; B60W 2520/28; B60W 2720/26; B60W 2720/30; B60K 28/16; B60T 2240/02; B60T 8/32; B60T 8/175; B60T 8/17616; B60L 15/2009; B60L 2240/12; B60L 2240/14; B60L 2240/42; B60L 2240/423; B60L 2240/461; B60L 2240/463; B60L 2240/465; B60L 2260/42; B60L 3/106
See application file for complete search history.

(56) References Cited

U.S. PATENT DOCUMENTS 5,428,532 A * 6/1995 Yasuno ................. B60T 8/1755
                                                            280/142
6,584,398 B1   6/2003 Erban
(Continued)

FOREIGN PATENT DOCUMENTS

DE          100 50 173 A1   4/2001
DE    10 2012 220 238 A1   5/2014
(Continued)

OTHER PUBLICATIONS

International Search Report (PCT/ISA/220 & PCT/ISA/210) issued in PCT Application No. PCT/EP2022/053531 dated Jun. 3, 2022 (six (6) pages).

(Continued)

*Primary Examiner* — Phutthiwat Wongwian
*Assistant Examiner* — Arnold Castro
(74) *Attorney, Agent, or Firm* — Crowell & Moring LLP

(57) ABSTRACT

A method for improving the force transmission between a wheel of a vehicle and the road is disclosed. The method has the following steps: determining target dynamics of a wheel; and, adjusting the dynamics of the wheel by a driving device of the vehicle by actively applying a torque to the wheel to set the target dynamics. A device, a vehicle, and a computer product are disclosed to execute the method.

18 Claims, 2 Drawing Sheets

(56) References Cited

U.S. PATENT DOCUMENTS

| | | | |
|---|---|---|---|
| 7,739,005 B1* | 6/2010 | Tang | B60L 3/10 |
| | | | 701/69 |
| 11,584,352 B2* | 2/2023 | Velazquez Alcantar | ...................... |
| | | | B60T 8/175 |
| 2015/0112508 A1* | 4/2015 | Kato | B60K 28/16 |
| | | | 701/1 |
| 2015/0298666 A1* | 10/2015 | Liu | B60T 8/245 |
| | | | 701/74 |
| 2016/0221446 A1* | 8/2016 | Suzuki | B60L 58/20 |
| 2020/0086877 A1* | 3/2020 | Zhang | B60W 50/038 |
| 2021/0078582 A1* | 3/2021 | Murase | B60W 10/08 |
| 2021/0370779 A1* | 12/2021 | Ford | B60L 3/106 |
| 2022/0281458 A1* | 9/2022 | Mederer | B60L 3/108 |
| 2023/0021794 A1* | 1/2023 | Kaiser | B60W 10/08 |
| 2023/0242121 A1* | 8/2023 | Salif | B60T 8/1764 |
| | | | 701/70 |

FOREIGN PATENT DOCUMENTS

| | | |
|---|---|---|
| DE | 10 2014 003 992 A1 | 9/2015 |
| DE | 10 2017 211 436 A1 | 1/2019 |
| EP | 2 853 438 A1 | 4/2015 |
| EP | 3 031 663 A1 | 6/2016 |
| EP | 3 636 479 A1 | 4/2020 |
| GB | 2577930 A | 4/2020 |

OTHER PUBLICATIONS

German-language Written Opinion (PCT/ISA/237) issued in PCT Application No. PCT/EP2022/053531 dated Jun. 3, 2022 (seven (7) pages).

German-language Office Action issued in German Application No. 10 2021 202 223.5 dated Apr. 1, 2021 (six (6) pages).

* cited by examiner

FORCE TRANSMISSION BETWEEN WHEEL AND ROAD

BACKGROUND AND SUMMARY

The present invention relates to a method for improving the force transmission between wheel and road. Further, the invention relates to a device, a vehicle, a computer program product and a storage medium.

When operating vehicles, situations arise from time to time, in which the dynamics of a wheel are different from the predetermined target dynamics. This is particularly the case in the event of a locking wheel due to a braking. Another case is, for example, the spinning of a driven wheel in the event of acceleration or during constant drive, when an excessively high driving torque is applied to the wheel or when the friction coefficient of the road changes, for example, when entering from a dry to a wet road section.

Thereby it is particularly disadvantageous that the wheel gets into a dynamic state, in which its maximum traction utilization is exceeded and no further force can be transmitted by the wheel. Thus, the wheel loses the ability to support sufficient driving, braking or cornering force on the road.

It is therefore an objective of the present invention to provide a way in which these situations can be avoided or at least shortened.

The objective is solved by the subject matters of the independent claims. Advantageous modifications are subject to the dependent claims.

According to the invention, a method for improving the force transmission between a wheel of a vehicle and the road is provided. The method comprises the following steps:
step A: determining target dynamics of a wheel; and
step B: adjusting the dynamics of the wheel by a driving device of the vehicle by actively applying a torque to the wheel to set the target dynamics.

The active application of the torque means that the driving device is not operated free of load but provides a torque for influencing the dynamics. When the wheel is to be accelerated as being too slow in relation to the target dynamics, the driving device provides an accelerating torque. When the driving device is capable of applying a braking torque, for example, since it comprises an electric driving engine, this braking torque is provided by the driving device, to, for example, adjust a wheel turning too fast to slower dynamics.

The application of the torque may be carried out directly, for example, by a direct or individual wheel drive of the wheel or by intermediate members, such as a gear.

Step B may thereby comprise the specification of a target value, such as a target torque to be applied to the respective wheel. The target value may also comprise a target driving torque under consideration of the transmission ratios and other boundary conditions of the drive train. Such a specification may then be implemented by a subordinate or downstream open-loop or closed-loop control circuit for open-loop or closed-loop control of the drive device or drive train, respectively. Alternatively or in addition, step B may also directly refer to the control of the drive device or drive train, respectively, by such open-loop or closed-loop control circuit, such that step B, for example, comprises the actual application of a torque to the wheel.

In an advantageous embodiment, step B comprises the application of a driving or accelerating torque to the wheel by the driving device of the vehicle to avoid or cancel a locking of the wheel and to thereby set the target dynamics.

By the method, it is thus advantageously achieved that an undesired state of the wheel, i.e. a state not corresponding to the target dynamics, is avoided or at least shortened by applying the torque by the driving device. The undesired state is thus adjusted to desired target dynamics.

Preferably, the method comprises a further step, in which a monitoring of the dynamics of the wheel is performed. Here, it is particularly examined, whether the target dynamics are present. Preferably, method step B is triggered by the monitoring result of this step, for example, by a deviation from the target dynamics exceeding a predetermined value.

However, step B may also be performed without a trigger by such monitoring result, in particular by operating step B in terms of a feedforward control and performing an adjustment by the driving device, without a deviation from the target dynamics being present or without the deviation from the target dynamics exceeding a predetermined value.

Preferably, step B is executed, if the target dynamics are not present or to maintain the target dynamics when present. Thus, step B may be advantageously used in line with the control method, in particular in line with the feedforward control, to avoid a deviation from the target dynamics.

Preferably, the driving device comprises an electric driving engine. In such event, the vehicle may be configured as a solely electrically driven vehicle, which is driven by electricity from a traction battery or a fuel cell. The electric driving engine may also be part of a hybrid drive train. An electric driving engine for performing the adjustment according to step B provides the advantage that it may be regulated very quickly and may provide both driving and braking torque. However, this does generally not exclude the utilization of other drive types, such as combustion engine drive types.

Preferably, the target dynamics correspond to dynamics of the wheel, at which an optimum traction utilization of the wheel is present. For example, during braking it is thereby required to set the wheel speed or the wheel rotational speed, respectively, such that an optimum wheel slip is achieved and the wheel may thus apply the maximum possible braking force. The specification of the target dynamics may, for example, be also directed to a traction utilization allowing the buildup of a required lateral force.

Preferably, the target dynamics according to step A are determined based on a target value, which particularly corresponds to a wheel target speed, a wheel target slip, a wheel target rotational speed and/or a wheel target acceleration. This target value is preferably determined in relation to a vehicle reference speed. The vehicle reference speed indicates the speed of the vehicle over ground. A respective target value may then be determined depending on this value to describe the desired target dynamics of the wheel. For example, this may be a wheel target speed, at which an optimum wheel slip for generating a braking force and/or cornering force as large as possible is achieved.

Preferably, step B is performed during or after an occurrence, which causes a deviation of the dynamics of the wheel from the target dynamics. Such an occurrence may be a locking of the wheel during braking. It may also be the spinning of a wheel due to a driving torque, which cannot be supported on the road in full.

Preferably, step B is executed during or after a brake intervention. Usually, a deviation of the dynamics of the wheel from the target dynamics occurs during the braking, at which the wheel supports the braking force or the braking torque, respectively, on the road. When this deviation is too large, the wheel can no longer support the entire braking force on the road. Thereby a locking of the wheel may also occur. The target dynamics are, for example, based on a wheel target speed, a wheel target slip, a wheel target rotational speed and/or a wheel target acceleration. In such event, an antilocking system of the vehicle, which reduces the braking force or a braking pressure, respectively, typically intervenes to re-accelerate the wheel by the vehicle inertia. Here, according to step B, the acceleration of the wheel is supported by the driving device by applying a driving torque to the wheel and thereby re-setting the dynamics of the wheel more quickly to the target dynamics than by a sole acceleration of the wheel by the vehicle inertia. Thereby applying the driving torque to the wheel may be carried out, when the braking pressure or the braking force is reduced such that the wheel turns again solely due to the inertia of the vehicle. However, applying the driving torque to the wheel may also be already carried out, when brake pressure is still applied or a braking force is acting. In such event, the wheel is accelerated more quickly, since the time of acceleration of the wheel already starts, when the increasing braking force is overcome. Thereby the dynamics of the wheel are advantageously set again to the target dynamics as soon as possible. Further, according to an advantageous embodiment of the invention, it may be provided that the driving device performs the adjustment according to step B already when no deviation from the target dynamics has yet occurred or the deviation has not yet exceeded a predetermined value, which would trigger an intervention of the antilocking system. Thus, the driving device may be used to actively hold the wheel at desired target dynamics.

Alternatively or in addition, step B is executed during or after an acceleration. Also here, an adjustment of the dynamics of the wheel by the driving device may be achieved. When a wheel, for example, deviates from the target dynamics as it starts to spin, a braking torque may be applied to the wheel by the driving device to re-adjust the dynamics to the target dynamics.

Preferably, step B is performed, when the wheel has exceeded the maximum traction utilization and particularly spins or locks.

Preferably, step B is performed such that the target dynamics are set without overshooting, wherein therefor, in particular, the driving device is controlled accordingly and/or the dynamics of the wheel are influenced by a brake. When the wheel is to be accelerated again to be adjusted to the target dynamics, this may be carried out by a high accelerating torque of the driving device, wherein the wheel is intercepted by the driving engine and/or by the brake when reaching the target dynamics such that no overshooting of the dynamics of the wheel occurs beyond the target dynamics.

Preferably, step B is performed individually for each wheel or axle by axle.

According to another aspect of the invention, a device for performing the above-described method is provided. The device comprises the following:
- an interface to control a driving device for applying a torque to the wheel; and
- a data processing unit configured to perform the above-described method.

According to another aspect of the invention, a vehicle is provided, comprising:
- a driving device; and
- an above-described device or wherein the vehicle is configured to perform the above-described method.

Preferably, the above-described device and the above-described vehicle also comprise respective features, which have been mentioned with respect to the description of the method according to the invention.

As another aspect of the present invention, a computer program product having program code, which, when being executed on a data processing unit, cause it to execute the above-described method, is provided. The data processing unit is preferably the same as the one provided in the above-described device.

As another aspect of the invention, a storage medium for being read by a data processing unit is provided, wherein the storage medium comprises an above-described computer program product. Thereby the invention may be transferred. The storage medium preferably comprises an USB stick, a memory card and/or a CD-ROM.

In the following, the invention is described with reference to preferred embodiments with the aid of the accompanying drawings.

DETAILED DESCRIPTION OF THE DRAWINGS

Figure 1:
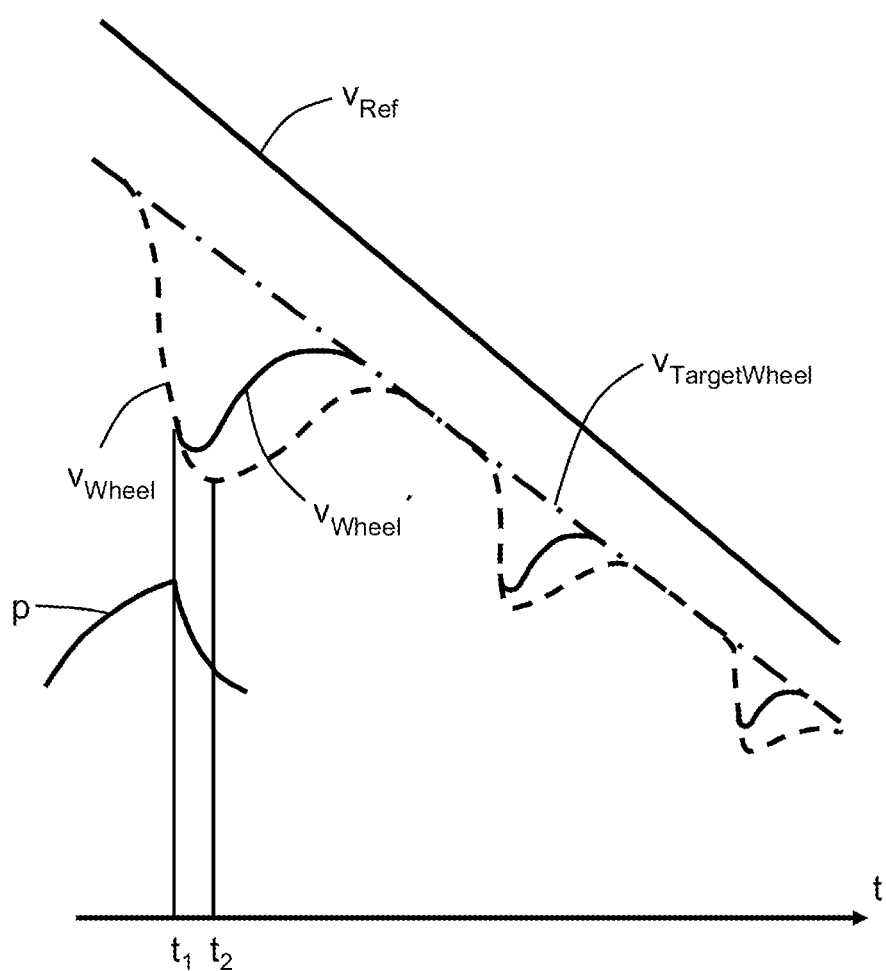
FIG. 1 shows an exemplary influencing of a wheel of a vehicle by a braking with interventions of an antilocking system.

FIG. 1 shows an exemplary influencing of a wheel of a vehicle by a braking with interventions of an antilocking system.

A timeline is shown, which shows the lapse of time from left to right.

Thereover, the time courses of a vehicle reference speed $v_{Ref}$, a wheel target speed $v_{TargetWheel}$ and a wheel speed $v_{Wheel}$ are shown.

The vehicle reference speed $v_{Ref}$ corresponds to the actual speed of the vehicle over ground. This is, for example, directly detected or determined by an estimation method.

The wheel target speed $v_{TargetWheel}$ describes target dynamics of the wheel, which are determined to ensure a desired transmission capability of the braking force on the road by the wheel. This is carried out by a comparison of the wheel target speed $v_{TargetWheel}$ with the vehicle reference speed $v_{Ref}$. Thus, a desired wheel slip to be reached to support the braking force on the road may be set by the wheel target speed $v_{TargetWheel}$.

The dynamics of the wheel are adjusted to the wheel target speed $v_{TargetWheel}$ during braking. The braking is thereby, for example, carried out by a friction brake, such as a disc or drum brake, or by an electrodynamic brake. In any event, a braking torque is applied to the wheel.

If the braking is too strong, a locking of the wheel occurs. This is recognizable by the dotted drops of the wheel speed $v_{Wheel}$, at which the wheel speed $v_{Wheel}$ decreases with a steep gradient. When the deviation of the wheel speed $v_{Wheel}$ from the wheel target speed $v_{TargetWheel}$ is too large or when the deviation exceeds a predetermined threshold, respectively, the braking at such wheel is stopped or the braking force is reduced, respectively, such that the wheel is re-accelerated by the vehicle inertia and can be brought up to the wheel target speed $v_{TargetWheel}$.

According to the invention, the time until the wheel re-establishes the wheel target speed $v_{TargetWheel}$ is shortened such that the wheel speed $v_{Wheel}$ is optimally set with respect to the vehicle reference speed $v_{Ref}$.

Therefore, an accelerating torque is applied to the wheel by the driving device of the vehicle to accelerate it in addition to the effect of the vehicle inertia. A course of a wheel speed $v_{Wheel'}$ resulting therefrom is represented by a corresponding solid line. Due to the accelerating effect of the torque of the driving device in comparison to a sole acceleration of the wheel by the inertia of the vehicle, it is achieved that the wheel speed $v_{Wheel'}$ arrives more quickly at the wheel target speed $w_{TargetWheel}$. The dynamics of the wheel are therefor returned more quickly to the optimum target dynamics, thus restoring the condition of optimum force transmission. In this way, the braking distance may be shortened.

Further, FIG. 1 shows the point in time, at which the driving device applies the torque for accelerating the wheel. As an example, the brake pressure p supplied to the brake is shown at the first drop of the wheel speed $v_{Wheel}$. The brake pressure p is built up until a point in time $t_1$. Subsequently, the antilocking system intervenes and the brake pressure p is released again. From a point in time $t_2$, the brake pressure is reduced to such an extent that the vehicle inertia is sufficient to re-accelerate the wheel, as recognizable by the dotted course of the wheel speed $v_{Wheel}$, since the reversal point of the wheel speed $v_{Wheel}$ is at $t_2$. Furthermore, it can be seen from the course of $v_{Wheel'}$ that the accelerating intervention of the driving device achieves that the reversal point is earlier, i.e. temporally before $t_2$. In this example, it is assumed that the driving device applies the accelerating torque to the wheel, when the point in time $t_1$ is exceeded, i.e. when the intervention by the antilocking system is carried out.

For further improvement of the method described here, it may also be provided that the accelerating torque by the driving device is already applied before the point in time $t_1$, i.e. before the intervention of the antilocking system. In this way, the accelerating effect by the driving device may directly start from the point in time $t_1$. If the applied torque is large enough, the accelerating effect may also overcompensate the braking force of the brake such that the accelerating effect already starts before the point in time $t_1$.

According to another advantageous embodiment of the invention, it is provided that the torque by the driving device is applied such that the accelerating effect already occurs before the drop of the wheel speed $v_{Wheel}$. In this way, by the interaction of brake and drive device, it may be achieved that a drop of the wheel speed $v_{Wheel}$ does not occur and, instead, the wheel speed $v_{Wheel}$ is held approximately permanently or exclusively permanently at the wheel target speed $v_{TargetWheel}$. Thus, a further improvement of the force transmission between wheel and road may be achieved in comparison to the embodiment shown in FIG. 1.

Figure 2:
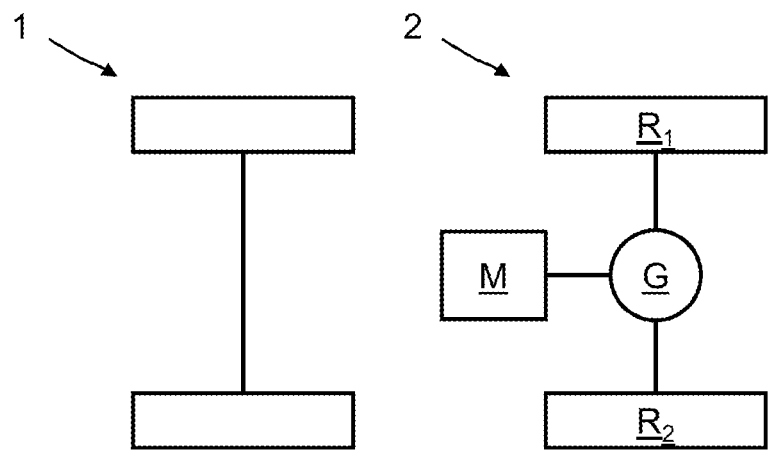
FIG. 2 shows a vehicle having an axle-by-axle drive.

FIG. 2 shows a vehicle having an axle-by-axle drive.

The shown vehicle comprises a non-driven axle 1. A second axle 2 of the vehicle is driven by the driving device M. Therefore, a gear G is provided that distributes the power of the driving device M to the wheels $R_1$, $R_2$ of the axle.

The vehicle is configured to adjust the dynamics of the wheels $R_1$, $R_2$ by the driving device M to predetermined target dynamics. The driving device M is therefore configured to provide a respective torque to the gear G, whereby it is distributed to the wheels $R_1$, $R_2$.

During braking, one of the wheels $R_1$, $R_2$ or both of the wheels $R_1$, $R_2$ may get locked or at least in a state, in which a deviation of the wheel speed $v_{Wheel}$ from the wheel target speed $v_{TargetWheel}$ exceeds a predetermined value, as previously described with respect to FIG. 1.

If such a state is present, the driving device M will apply a respective torque to the wheels $R_1$, $R_2$ via the gear G to adjust their wheel speed $v_{Wheel}$ to the wheel target speed $v_{TargetWheel}$ or to maintain the wheel target speed $v_{TargetWheel}$.

In such event, this may be carried out by applying an accelerating torque by the driving device M.

Even without a presence of a braking, the driving device may be used to adjust the dynamics of the wheel to the target dynamics.

When the vehicle accelerates and one of the wheels $R_1$, $R_2$ or both of the wheels $R_1$, $R_2$ start(s) to spin, a braking effect by a respective torque applied to the wheels $R_1$, $R_2$ by the driving device M and via the gear G may be applied to these such that they are braked again. This implies that the driving device M is configured to apply a respective torque. For example, this is the case when the driving device M comprises an electric driving engine (electric machine/motor).

This also applies for the case, in which the ground of the wheels $R_1$, $R_2$ changes, as mentioned at the beginning. That is, a deviation of the dynamics of the wheels $R_1$, $R_2$ from target dynamics may be provided during a constant drive, a braking or an acceleration, wherein then the target dynamics at the wheels $R_1$, $R_2$ may be set accordingly by the driving device M.

In the shown embodiment, the gear G has to be configured accordingly to distribute the torque of the driving device M to the wheels $R_1$, $R_2$ as required.

Figure 3:
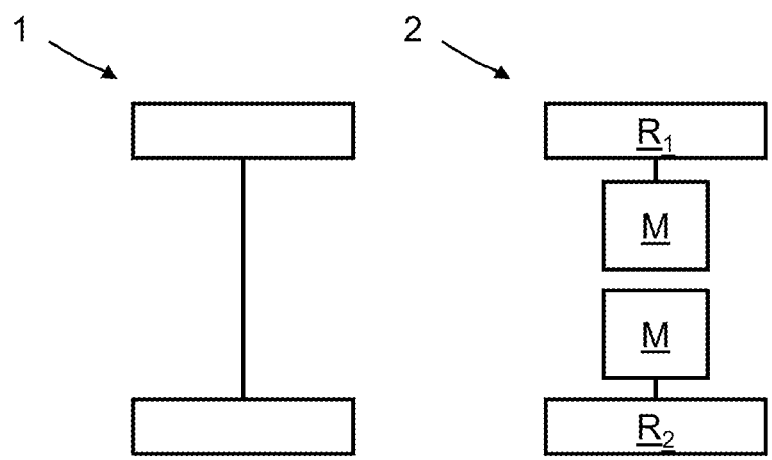
FIG. 3 shows a vehicle having an individual wheel drive.

FIG. 3 shows a vehicle having an individual wheel drive.

In contrast to the embodiment of FIG. 2, a separate driving device M is assigned here to each wheel $R_1$, $R_2$ of the axle 2. Thus, influencing the dynamics individually for each wheel towards target dynamics is possible, whereas in the embodiment shown in FIG. 2, a torque for influencing by the drive device M must be directed to the wheel whose dynamics deviate from the target dynamics.

Otherwise, the operating principles of this embodiment correspond to the ones as shown in FIG. 2.

LIST OF REFERENCE SIGNS 1 axle
2 axle
G gear
M driving device
p brake cylinder pressure
$R_1$ wheel
$R_2$ wheel
t time
$t_1$ point in time
$t_2$ point in time
$v_{Ref}$ vehicle reference speed
$v_{TargetWheel}$ wheel target speed
$v_{Wheel}$ wheel speed
$v_{Wheel'}$ wheel speed

What is claimed is:

1. A method for improving a force transmission between a wheel of a vehicle and a road, the method comprising:
    determining a target speed of the wheel that ensures a transmission capability of a braking force on a road by the wheel;
    applying brake pressure to the wheel;
    determining an actual speed of the wheel; and
    in response to a difference between the target speed of the wheel and the actual speed of the wheel exceeding a threshold:
        releasing the brake pressure from the wheel; and
        applying an accelerating torque to the wheel.

2. The method of claim 1, wherein the accelerating torque is applied to maintain the actual speed of the wheel matching the target speed of the wheel.

3. The method of claim 1, wherein the accelerating torque is applied during or after an occurrence that causes the actual speed of the wheel to deviate from the target speed of the wheel.

4. The method of claim 1, wherein the torque is applied in response to the wheel exceeding a maximum traction utilization.

5. The method of claim 1, wherein the torque is applied during or after a brake intervention or an acceleration.

6. The method of claim 1, wherein the torque is applied by an electric driving engine.

7. The method of claim 1, wherein the target wheel speed provides the wheel with optimum traction utilization.

8. The method of claim 1, wherein the target wheel speed is determined based on a target value.

9. The method of claim 1, further comprising:
applying a brake to the wheel to prevent the applied torque from overshooting the target wheel speed.

10. The method of claim 1, wherein the wheel is one of a plurality of wheels, and wherein the torque is applied individually for each wheel or on an axle-by-axle basis.

11. A vehicle comprising:
a wheel; and
a data processing unit configured to:
determine a target speed of the wheel that ensures a transmission capability of a braking force on a road by the wheel;
apply brake pressure to the wheel;
determine an actual speed of the wheel; and
in response to a difference between the target speed of the wheel and the actual speed of the wheel exceeding a threshold:
release the brake pressure from the wheel; and
apply an accelerating torque to the wheel.

12. The vehicle of claim 11, wherein the accelerating torque is applied after the brake pressure is released from the wheel.

13. The vehicle of claim 11, wherein the accelerating torque is applied before the brake pressure is released from the wheel.

14. The vehicle of claim 11, wherein the accelerating torque is applied directly from a driving device to the wheel.

15. The vehicle of claim 11, wherein the accelerating torque is applied indirectly from a driving device to the wheel via a gear.

16. The vehicle of claim 11, wherein the accelerating torque is applied by an electric engine.

17. The vehicle of claim 11, wherein the accelerating torque is applied to an axle of the wheel.

18. A vehicle comprising:
a wheel; and
means for applying an accelerating torque to the wheel to cause the wheel to reach a target speed, wherein the target speed is reached faster by applying the accelerating torque as compared to relying upon vehicle inertia to provide acceleration.

* * * * *